G. H. PERSON & R. UHLER.
LAWN TRIMMER.
APPLICATION FILED NOV. 17, 1908.
935,225.
Patented Sept. 28, 1909.
2 SHEETS—SHEET 1.
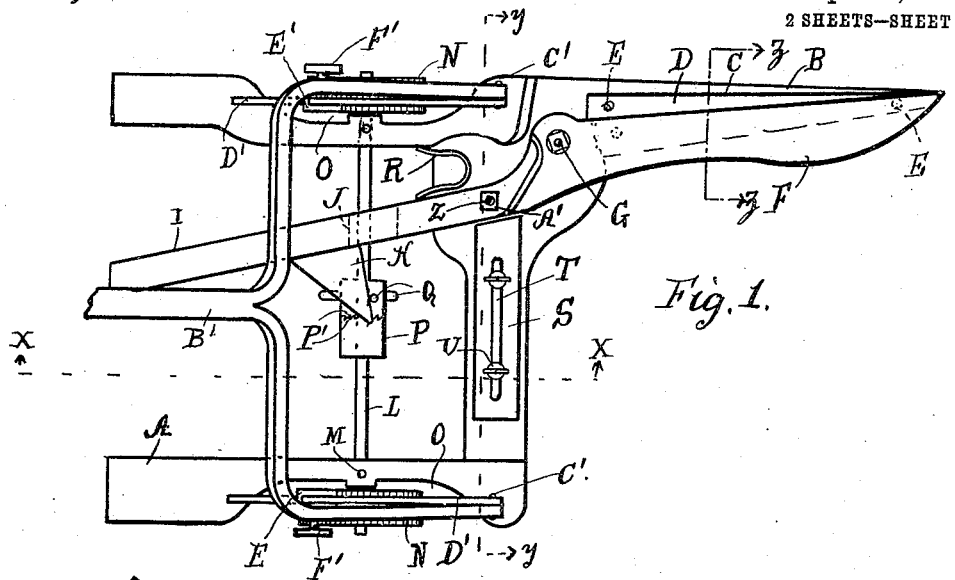
Fig. 1.
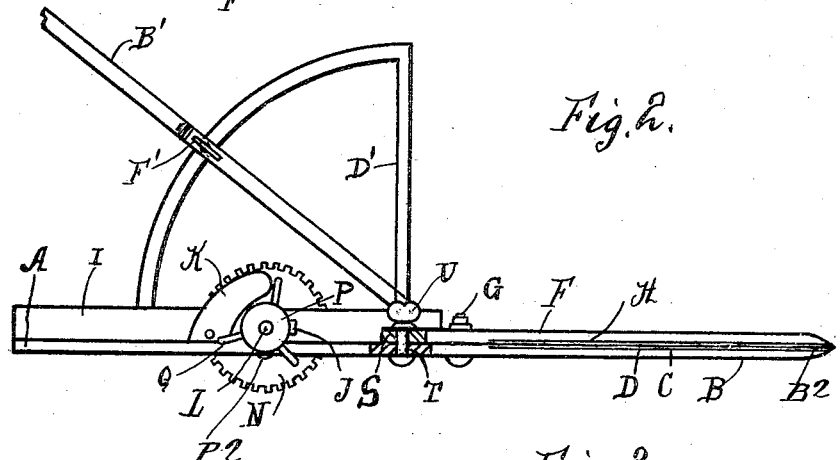
Fig. 2.
Fig. 3.
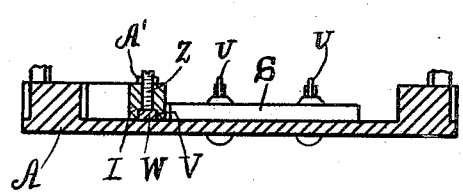
WITNESSES
S. M. Gallagher
K. Burton
INVENTORS
George H. Person
Reuben Uhler
BY
ATTORNEY G. H. PERSON & R. UHLER.
LAWN TRIMMER.
APPLICATION FILED NOV. 17, 1908.
935,225.
Patented Sept. 28, 1909.
2 SHEETS—SHEET 2.
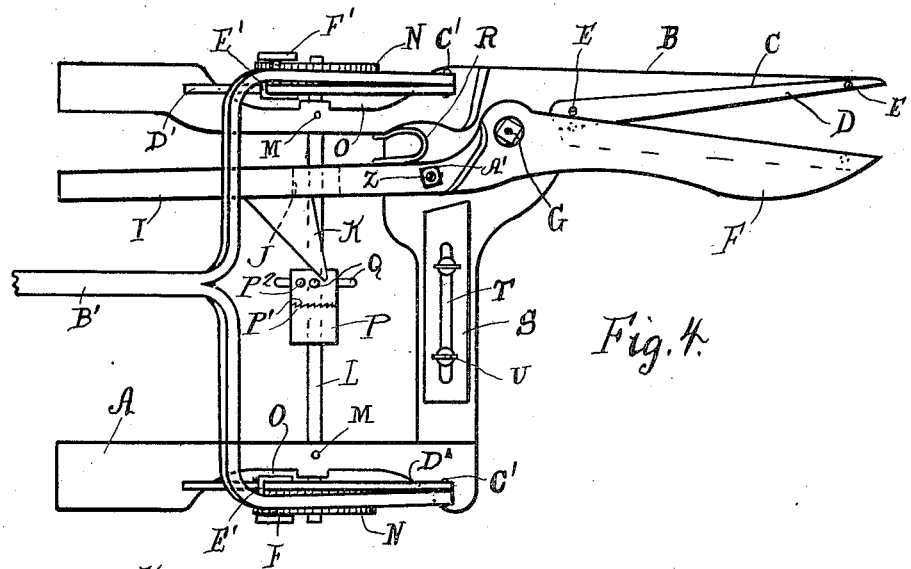
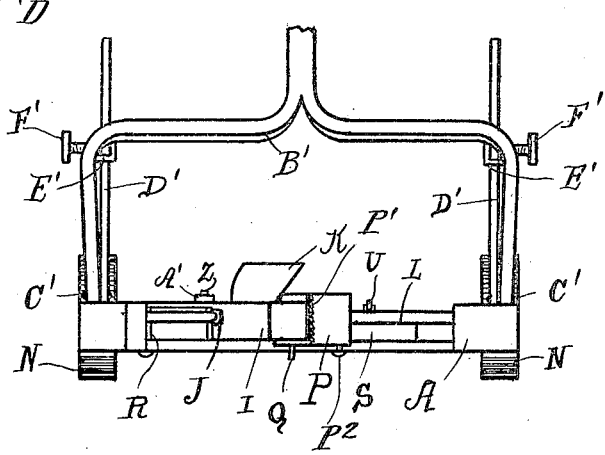
WITNESSES
S. M. Gallagher
H. Burton
INVENTORS
George H. Person
Reuben Uhler
BY
W. Preston Williamson
ATTORNEY

UNITED STATES PATENT OFFICE.

GEORGE H. PERSON AND REUBEN UHLER, OF EASTON, PENNSYLVANIA.

LAWN-TRIMMER.

935,225.  Specification of Letters Patent.  Patented Sept. 28, 1909.

Application filed November 17, 1908. Serial No. 463,022.

*To all whom it may concern:*

Be it known that we, GEORGE H. PERSON and REUBEN UHLER, citizens of the United States, residing at Easton, county of Northampton, and State of Pennsylvania, have invented a certain new and useful Improvement in Lawn-Trimmers, of which the following is a specification.

Our invention relates to a new and useful improvement in lawn trimmers, and has for its object to provide an exceedingly simple and effective device of this character which will trim the grass or weeds which grow close to fences, hedges, or grave mounds.

Another object of our invention is to provide a device of this character which will be inexpensive in manufacture, and one in which the parts may be readily adjusted to secure the most efficient results.

With these ends in view, this invention consists in the details of construction and combination of elements hereinafter set forth and then specifically designated by the claims.

In order that those skilled in the art to which this invention appertains may understand how to make and use the same, we will describe its construction in detail, referring by letter to the accompanying drawing forming a part of this specification, in which—

Figure 1 is a plan view of our improved lawn trimmer showing the blades closed. Fig. 2, a section at the line X—X of Fig. 1 looking in the direction of the arrow, a portion of the handle being broken away. Fig. 3, a section at the line Y—Y of Fig. 1 looking in the direction of the arrow. Fig. 4, a plan view showing the blades open, and Fig. 5, a rear view thereof. Fig. 6, is a section at the line z—z of Fig. 1 looking in the direction of the arrows.

In carrying out our invention as here embodied, A represents the framework with which is formed the stationary blade B, said blade extending from one side of the frame forward from the front end thereof. If found desirable this blade may have a depression C formed therein for the reception of a supplementary steel blade D which is secured within said depression by means of the screws E.

F denotes the movable blade pivoted to the rear of the stationary blade by the bolt G. This blade F may also have a depression H formed therein for the reception of a steel blade $B^2$ the same as the stationary blade B. Formed with the movable blade F is a handle I in which is formed a slot J for the purpose to be hereinafter described, and attached to one side of this handle is the cam K.

L denotes an axle passing through the slot J formed in the handle I and journaled in bearings in the frame with which the oil holes M communicate for lubricating said axle. On the ends of this axle are immovably secured the wheels N so that when said wheels revolve the axle L will do likewise, and in order that these wheels may not come in contact with the object around which the trimmer is being used the frame is cut away as indicated at O, and these wheels work within this cutaway portion. To the axle L in proximity to the cam K is adjustably secured the sleeve P by means of the set screws $P^2$ and to said sleeve are secured the pins Q adapted to engage with the cam K for operating the movable blade F. The sleeve P is formed in two parts the abutting faces having ratchet teeth P′ formed thereon so that the trimmer may be moved backward without interfering with the cutting parts. The pins are so situated upon the sleeve P that when one of them is disengaged from the cam K said cam will at once come in engagement with the following pin, thus producing to the movable blade a quick and constant motion, that is to say, as the pin travels toward the end of the cam it will gradually open the blade F and when it passes beyond the cam the blade will at once snap back again by the action of the spring R at which time the cam will at once engage with the following pin again reopening the blade F, and these movements are continued as long as the device is moved along the ground.

In order that a certain amount of strain due to the closing of the blade F may be removed from the pins Q we provide a stop S having a slot T formed therein through which pass the thumb screws U, said screws being then threaded into the frame of the device, thus it will be seen that by moving the stop S toward the handle of the movable blade then tightening the thumb screws U each time the blade F closes the handle thereof will come in contact with the end of the stop S before engaging with one of the pins Q.

In order that the cutting portion of the blades may always come in contact with one another we form an opening V in which is placed the block W, said block adapted to rest against the forward portion of the frame, and against the upper face of this block rests the lower end of the screw Z on the upper end of which is threaded the lock nut A' for locking the screw Z in its adjusted position. When the blades have become worn or out of adjustment so that the cutting edges do not come in contact with one another by backing off the lock nut A' and threading the screw Z inward it will cause the movable blade to be moved downward against the stationary blade, then the lock nut may be jammed against the upper surface of the handle I which will hold the screw Z in its adjustment.

To enable the user to readily manipulate the trimmer we provide the handle B' the ends of which are pivoted to the frame as indicated by C', and beside this handle is placed the adjusting segment D' around which passes the bracket E', the ends thereof being secured to the handle B', and passing through the handles are the set screws F' which are adapted to engage with the adjusting segment D' so that the handles may be adjusted to different heights to suit the person using the trimmer.

In practice the lawn trimmer is pushed along the ground causing the wheels N to revolve which will do likewise with the axle L and the sleeve P, and as the pins Q which are secured to the sleeve P move along the cam K it will cause the handle I to move away from the sleeve P thus opening the blade F, and when the pin Q passes beyond the cam the spring R will cause the handle I to return to its original position closing the movable blade F with a quick snappy movement which will cut the grass or weeds.

Of course we do not wish to be limited to the exact details of construction here shown as these may be varied within certain limits, such as placing a casing over the pins on the sleeve to prevent the grass becoming entangled in said pins.

Having thus fully described our invention, what we claim as new and useful, is—

1. In a lawn trimmer, a frame, a stationary blade formed therewith, said blade having a depression formed therein, a supplementary steel blade adapted to rest in said depression, screws for securing said supplementary blade to the stationary blade, a movable blade pivoted to the rear portion of the stationary blade, said blade having a depression formed therein, a steel blade adapted to rest in said depression, screws for securing said steel blade to the movable blade, a spring placed between the handle portion of the movable blade and the frame so as to continually press said handle away from the frame, a cam secured to the side of the handle portion of the movable blade, an axle journaled in the frame, wheels immovably secured to the ends of said axle, a sleeve adjustably fastened to the axle, pins attached thereto adapted to engage with the cam, a handle pivoted to the frame, adjusting segments secured to the frame in proximity to the handle, brackets the ends of which are secured to the handle adapted to pass around the adjustable segments, and set screws passing through the handle adapted to engage with the adjusting segments, as and for the purpose set forth.

2. In a lawn trimmer, a frame, a stationary blade formed therewith, said blade having a depression formed therein, a supplementary steel blade adapted to rest in said depression, screws for securing said supplementary blade to the stationary blade, a movable blade pivoted to the rear portion of the stationary blade, said blade having a depression formed therein, a steel blade adapted to rest in said depression, screws for securing said steel blade to the movable blade, a handle portion formed with said movable blade, a spring placed between the handle portion of the movable blade and the frame so as to continually press said handle away from the frame, a cam secured to the side of the handle portion of the movable blade, an axle journaled in the frame, wheels immovably secured to the ends of said axle, a sleeve adjustably fastened to the axle, pins attached thereto adapted to engage with the cam, a handle pivoted to the frame, adjusting segments secured to the frame in proximity to the handle, brackets the ends of which are secured to the handle adapted to pass around the adjustable segments, and set screws passing through the handle adapted to engage with the adjusting segments, as and for the purpose set forth.

3. In a lawn trimmer, a frame, a stationary blade formed therewith, a movable blade pivoted to the rear portion of the stationary blade, a handle formed with said movable blade having a slot and opening formed therein, a cam secured to the handle portion of the movable blade, an axle passing through the slot in the handle of the movable blade journaled to the frame, wheels movably secured to the ends of the axle, a sleeve formed of two parts having ratchet teeth on their abutting faces, means for adjustably securing said sleeve to the axle, pins attached to said sleeve adapted to engage with the cam for opening the movable blade, a spring placed between the handle portion of the movable blade and the frame for closing said movable blade, a block placed in the opening in the handle portion of the movable blade, a screw passing through said handle and resting against the upper portion of the block, a lock nut threaded on the upper end of said screw, and a handle adjustably secured to the frame, substantially as shown and described.

4. In a lawn trimmer, a frame, a stationary blade formed therewith, a movable blade pivoted to the rear portion of the stationary blade, a handle formed with said movable blade having a slot and opening formed therein, a cam secured to the handle portion of the movable blade, an axle passing through the slot in the handle of the movable blade and journaled to the frame, wheels immovably secured to the ends of the axle, a sleeve, means for adjustably securing said sleeve to the axle, pins attached to said sleeve adapted to engage with the cam for opening the movable blade, a spring placed between the handle portion of the movable handle and the frame for closing said movable blade, a block placed in the opening in the handle portion of the movable blade, a screw passing through said handle and resting against the upper portion of the block, a lock nut threaded on the upper end of said screw, a handle adjustably secured to the frame, a stop having a slot formed therein one end of which is adapted to engage with the handle of the movable blade, and thumb screws passing through said slot and threaded into the forward end of the frame, as and for the purpose set forth.

In testimony whereof, we have hereunto affixed our signatures in the presence of two subscribing witnesses.

GEORGE H. PERSON.
REUBEN UHLER.

Witnesses:
J. McC. Snyder,
E. L. Brown.